(12) United States Patent
Tsfasman et al.

(10) Patent No.: US 9,659,552 B1
(45) Date of Patent: *May 23, 2017

(54) AUTOMATIC TUNING FLOATING BRIDGE FOR ELECTRIC STRINGED INSTRUMENTS

(71) Applicant: International Business Machines Corporation, Armonk, NY (US)

(72) Inventors: Arkadiy O. Tsfasman, Wappingers Falls, NY (US); John S. Werner, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/278,162

(22) Filed: Sep. 28, 2016

Related U.S. Application Data

(63) Continuation of application No. 15/208,638, filed on Jul. 13, 2016, now Pat. No. 9,536,505, which is a
(Continued)

(51) Int. Cl.
 *G10H 3/18* (2006.01)
 *G10H 3/12* (2006.01)
 (Continued)

(52) U.S. Cl.
 CPC ............... *G10G 7/00* (2013.01); *G05B 15/02* (2013.01); *G10D 3/04* (2013.01); *G10D 3/12* (2013.01);
 (Continued)

(58) Field of Classification Search
 CPC . G10D 3/14; G10D 3/146; G10D 3/04; G05B 15/02; G10G 7/02; G10H 1/44; G10H 3/186; G10H 3/18
 (Continued)

(56) References Cited

U.S. PATENT DOCUMENTS

| | | | | |
|---|---|---|---|---|
| 4,426,907 A | * | 1/1984 | Scholz | G10G 7/02 318/6 |
| 4,803,908 A | * | 2/1989 | Skinn | G10G 7/02 84/454 |

(Continued)

FOREIGN PATENT DOCUMENTS

| | | |
|---|---|---|
| JP | 2003223163 A | 8/2003 |
| JP | 2005208419 A | 8/2005 |

OTHER PUBLICATIONS

"AxCENT Tuning Systems", Frequently asked questions, 2 pages, printed on Jul. 31, 2015, <http://axcenttuning.com/faq.html>.

(Continued)

*Primary Examiner* — David Warren
*Assistant Examiner* — Christina Schreiber
(74) *Attorney, Agent, or Firm* — Edward J. Wixted, III

(57) ABSTRACT

A method, computer program product, and system for automatically tuning a stringed instrument. An initial height of a first string of an instrument having a plurality of strings and a floating bridge is determined. The height of the plurality of strings is determined using a bridge sensor. The floating bridge is locked. A frequency of the first string is analyzed. In response to determining the frequency of the first string does not match a predetermined frequency, a tuning peg servo motor to adjust a tuning peg, thereby adjusting a string tension of the first string. The one or more bridge servo motors adjusts a spring tension until the spring tension of the one or more springs equals the string tension of the first string. In response to determining the first string is tuned, the floating bridge is unlocked.

1 Claim, 8 Drawing Sheets

Related U.S. Application Data continuation of application No. 14/953,490, filed on Nov. 30, 2015, now Pat. No. 9,536,504.

(51) Int. Cl.
| | |
|---|---|
| *G10H 1/44* | (2006.01) |
| *G10D 3/14* | (2006.01) |
| *G10G 7/00* | (2006.01) |
| *G10D 3/04* | (2006.01) |
| *G10D 3/12* | (2006.01) |
| *G05B 15/02* | (2006.01) |
| *G10G 7/02* | (2006.01) |

(52) U.S. Cl.
CPC ............... *G10D 3/14* (2013.01); *G10D 3/146* (2013.01); *G10G 7/02* (2013.01); *G10H 1/44* (2013.01); *G10H 3/18* (2013.01); *G10H 3/186* (2013.01); *G10H 2210/066* (2013.01)

(58) Field of Classification Search
USPC ................................................. 84/304, 742
See application file for complete search history.

(56) References Cited

U.S. PATENT DOCUMENTS

| | | | | |
|---|---|---|---|---|
| 4,892,025 | A * | 1/1990 | Steinberger | G10D 3/146 84/313 |
| 5,054,360 | A * | 10/1991 | Lisle | G10H 1/0066 84/645 |
| 5,095,797 | A * | 3/1992 | Zacaroli | G10G 7/02 84/455 |
| 5,127,298 | A * | 7/1992 | Snape | G10D 3/146 84/313 |
| 5,198,601 | A * | 3/1993 | McCabe | G10D 3/146 84/298 |
| 5,281,754 | A | 1/1994 | Farrett et al. | |
| 5,323,680 | A * | 6/1994 | Miller | G10D 3/14 84/455 |
| 5,343,793 | A * | 9/1994 | Pattie | G10D 3/14 84/297 R |
| 5,359,144 | A * | 10/1994 | Benson | G10D 3/143 84/313 |
| 5,390,579 | A * | 2/1995 | Burgon | G10D 3/14 84/297 R |
| 5,767,429 | A * | 6/1998 | Milano | G10G 7/02 84/297 R |
| 5,808,221 | A | 9/1998 | Ashour et al. | |
| 5,824,929 | A * | 10/1998 | Freeland | G10D 3/14 84/454 |
| 5,886,270 | A * | 3/1999 | Wynn | G10G 7/02 84/313 |
| 6,137,042 | A | 10/2000 | Kurtzberg et al. | |
| 6,184,452 | B1 * | 2/2001 | Long | G10D 3/14 84/457 |
| 6,191,349 | B1 | 2/2001 | Flam | |
| 6,415,584 | B1 * | 7/2002 | Whittall | G10D 3/14 84/290 |
| 6,686,524 | B2 * | 2/2004 | Hirayama | G10D 3/146 84/291 |
| 7,053,287 | B2 * | 5/2006 | Dam | G10D 3/146 84/313 |
| 7,189,908 | B2 * | 3/2007 | Lavineway | G10D 3/146 84/313 |
| 7,235,730 | B2 * | 6/2007 | Hirayama | G10D 3/146 84/307 |
| 7,446,248 | B2 * | 11/2008 | Skinn | G10D 3/143 84/312 R |
| 7,514,623 | B1 | 4/2009 | Spinler et al. | |
| 7,531,731 | B2 * | 5/2009 | Longo | G10D 3/146 84/312 R |
| 7,935,876 | B1 * | 5/2011 | West | G10D 3/146 84/200 |
| 2004/0007116 | A1 * | 1/2004 | Marcus | G10C 3/00 84/10 |
| 2004/0051925 | A1 * | 3/2004 | Smart | G10D 3/146 359/237 |
| 2004/0231488 | A1 * | 11/2004 | Hontsch | G10D 3/146 84/313 |
| 2007/0214931 | A1 * | 9/2007 | Lyles | G10D 3/12 84/267 |
| 2008/0229900 | A1 * | 9/2008 | Steinberger | G10D 3/146 84/313 |
| 2008/0282869 | A1 * | 11/2008 | Adams | G10D 3/04 84/455 |
| 2013/0186255 | A1 * | 7/2013 | McCabe | G10D 3/146 84/313 |
| 2014/0150630 | A1 * | 6/2014 | Juszkiewicz | G10H 1/44 84/626 |
| 2015/0047493 | A1 * | 2/2015 | Leadbetter | G10H 1/44 84/454 |

OTHER PUBLICATIONS

"Tremolo EverTunes", Evertune®, 2 pages, © 2012 EverTune®, <http://www.evertune.com/Trem/>.

Tsfasman et al., "Automatic Tuning Floating Bridge for Electric Stringed Instruments", U.S. Appl. No. 14/953,490, filed Nov. 30, 2015, pp. 1-31.

Tsfasman et al., "Automatic Tuning Floating Bridge for Electric Stringed Instruments", U.S. Appl. No. 15/208,638, filed Jul. 13, 2016, pp. 1-24.

Tsfasman et al., "Automatic Tuning Floating Bridge for Electric Stringed Instruments", U.S. Appl. No. 15/334,676, filed Oct. 26, 2016, pp. 1-25.

IBM Appendix P, "List of IBM Patents or Patent Applications to be Treated as Related", Dated Dec. 6, 2016, 2 pages.

* cited by examiner

FIG. 5

AUTOMATIC TUNING FLOATING BRIDGE FOR ELECTRIC STRINGED INSTRUMENTS

BACKGROUND OF THE INVENTION

The present invention relates generally to the field of tuning stringed instruments, and more particularly to an automatic tuning floating bridge for electric stringed instruments.

Bridges for electric stringed instruments (e.g., guitars) can be either floating or fixed. A bridge is an anchoring point at the base of the instrument. A fixed bridge provides no active control over string tension or pitch. Often, a floating bridge includes a tremolo arm that extends from below the string anchoring point and acts as a lever that the user can push or pull to change the strings tension and, as a result, the pitch of the strings. Frequently, a floating bridge can be positioned by a user to a desired angle. Electric instruments utilizing a floating bridge can be tuned by balancing string tension using the tunings pegs at the head of the instrument and by raising or lowering the bridge by adjusting spring tension on the back of the guitar.

SUMMARY

According to one embodiment of the present invention, a method for automatic tuning floating bridge for electric stringed instruments is provided. The method includes determining, by one or more processors, an initial height of a first string of an instrument having a plurality of strings and a floating bridge, wherein a height of the plurality of strings is determined using a bridge sensor; locking, by one or more processors, the floating bridge; analyzing, by one or more processors, a frequency of a first string; in response to determining the frequency of the first string does not match a predetermined frequency, causing, by one or more processors, a tuning peg servo motor to adjust a tuning peg, thereby adjusting a string tension of the first string; causing, by one or more processors, the one or more bridge servo motors to adjust a spring tension in one or more springs attached to the floating bridge, wherein the spring tension of the one or more springs equals the string tension of the first string; and in response to determining the first string is tuned, unlocking, by one or more processors, the floating bridge.

According to another embodiment of the present invention, a computer program product for automatic tuning floating bridge for electric stringed instruments is provided. The computer program product comprises a computer readable storage medium and program instructions stored on the computer readable storage medium. The program instructions include program instructions to determine an initial height of a first string of an instrument having a plurality of strings and a floating bridge, wherein a height of the plurality of strings is determined using a bridge sensor; program instructions to lock the floating bridge; program instructions to analyze a frequency of a first string; in response to determining the frequency of the first string does not match a predetermined frequency, program instructions to cause a tuning peg servo motor to adjust a tuning peg, thereby adjusting a string tension of the first string; program instructions to cause the one or more bridge servo motors to adjust a spring tension in one or more springs attached to the floating bridge, wherein the spring tension of the one or more springs equals the string tension of the first string; and in response to determining the first string is tuned, program instructions to unlock the floating bridge.

According to another embodiment of the present invention, a computer system for automatic tuning floating bridge for electric stringed instruments is provided. The computer system includes one or more computer processors, one or more computer readable storage media, and program instructions stored on the computer readable storage media for execution by at least one of the one or more processors. The program instructions include program instructions to determine an initial height of a first string of an instrument having a plurality of strings and a floating bridge, wherein a height of the plurality of strings is determined using a bridge sensor; program instructions to lock the floating bridge; program instructions to analyze a frequency of a first string; in response to determining the frequency of the first string does not match a predetermined frequency, program instructions to cause a tuning peg servo motor to adjust a tuning peg, thereby adjusting a string tension of the first string; program instructions to cause the one or more bridge servo motors to adjust a spring tension in one or more springs attached to the floating bridge, wherein the spring tension of the one or more springs equals the string tension of the first string; and in response to determining the first string is tuned, program instructions to unlock the floating bridge.

BRIEF DESCRIPTION OF THE DRAWINGS

FIG. 5 is a table depicting guitar frets and notes versus frequencies, in accordance with an embodiment of the present invention;

DETAILED DESCRIPTION

An embodiment of the present invention recognizes that stringed instruments can get out of tune while being played. For example, as the musician plucks the strings, the tension in string changes over time. As the tension in the string changes, the frequency of the notes played on the string change; in affect, changing the tune of the instrument. Often, an instrument needs to be re-tuned (e.g., tension of the strings need to be modified) after a short period of play. Embodiments of the present invention recognize that an out of tune instrument can affect the quality of music. Embodiments of the present invention apply to all electric stringed instruments using a floating bridge (e.g., a violin, an acoustic electric guitar, etc.); however, for ease of description, embodiments will be described with reference to an electric guitar. Typically, an electric guitar is tuned by locking the bridge, tuning the guitar using the tuning pegs at the head of the guitar, and adjusting the springs on the back of the guitar until the spring tension matches the tension of the strings. Embodiments of the present invention recognize that this can be a complicated and time consuming process.

An embodiment of the present invention provides a technique for automatically retuning a guitars. By making small corrective changes to the tension of the guitar strings, as the string tension changes due to playing, the guitar can be kept in tune. Further, an embodiment of the present invention makes corrective changes to the tension of a guitar string as the guitar is being played. Embodiments of the present invention provide retuning through subtle changes to the string tension while the guitar is in use. In some embodiments, the use of subtle changes allows the guitar to be tuned without causing noticeable changes to the sound. An embodiment of the present invention provides a means for a user to change the tuning of a guitar during a performance. For example, the user can select a different tuning between or during a song.

Figure 1:
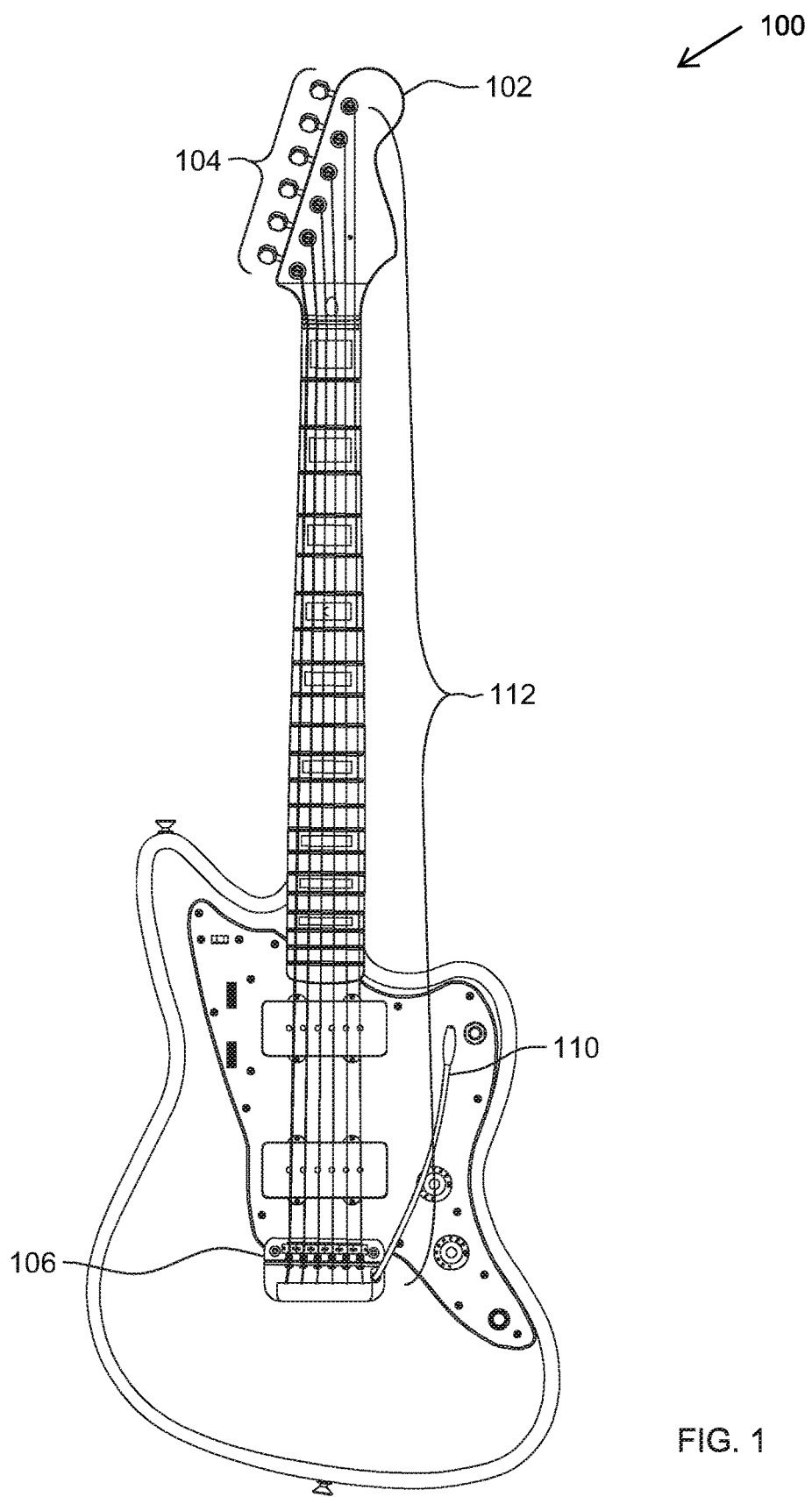
FIG. 1 is an illustration of a guitar, in accordance with an embodiment of the present invention.

The present invention will now be described in detail with reference to the Figures. FIG. 1 is an illustration of a guitar, in accordance with an embodiment of the present invention. For example, FIG. 1 is an illustration of a guitar in guitar environment 100. Guitar environment 100 includes strings 112 that run from guitar head 102 to bridge 106.

Guitar head 102 includes tuning pegs 104 and a head controller (not shown). Each tuning peg is associated with a string. For example, when a tuning peg is rotated, the tension in the associated string is adjusted. In some embodiments, the head controller controls servo motors attached to tuning pegs 104. In these embodiments, a user can interact with the head controller to tune strings 112 via tuning pegs 104. For example, to tune strings 112, the head controller sends a signal to servo motors attached to tuning pegs 104, causing tuning pegs 104 to either tighten or loosen strings 112. Turning tuning pegs 104 changes the tension in strings 112, causing the frequency of notes played on strings 112 to change.

The body of the guitar includes bridge 106, tremolo arm 110, and a bridge controller (not shown). In various embodiments, the body of the guitar also includes various sensors. For example, infrared (IR) sensors and magnetic pickups can be located at the bridge of the guitar. IR sensor measures the height of the strings from the guitar and allow the bridge controller to keep the strings at a desired height. Magnetic pickups measure disturbances to their magnetic field caused by string vibrations and produce a voltage which is used by an amplifier to produce sound. The magnetic pickup signal is monitored by the bridge controller to measure the frequency of notes. The height of bridge 106 is adjustable, allowing a user to select the height of strings 112. In some embodiments, tremolo bar 110 can be used to set the desired position of bridge 106. Strings 112 are anchored by bridge 106. Bridge 106 includes an assembly, as described in FIG. 7. Springs in the bridge assembly balance the tension in strings 112 to maintain the position of bridge 106. In some embodiments, tension of the bridge springs can be adjusted to balance with the tension of strings 112.

Figure 2:
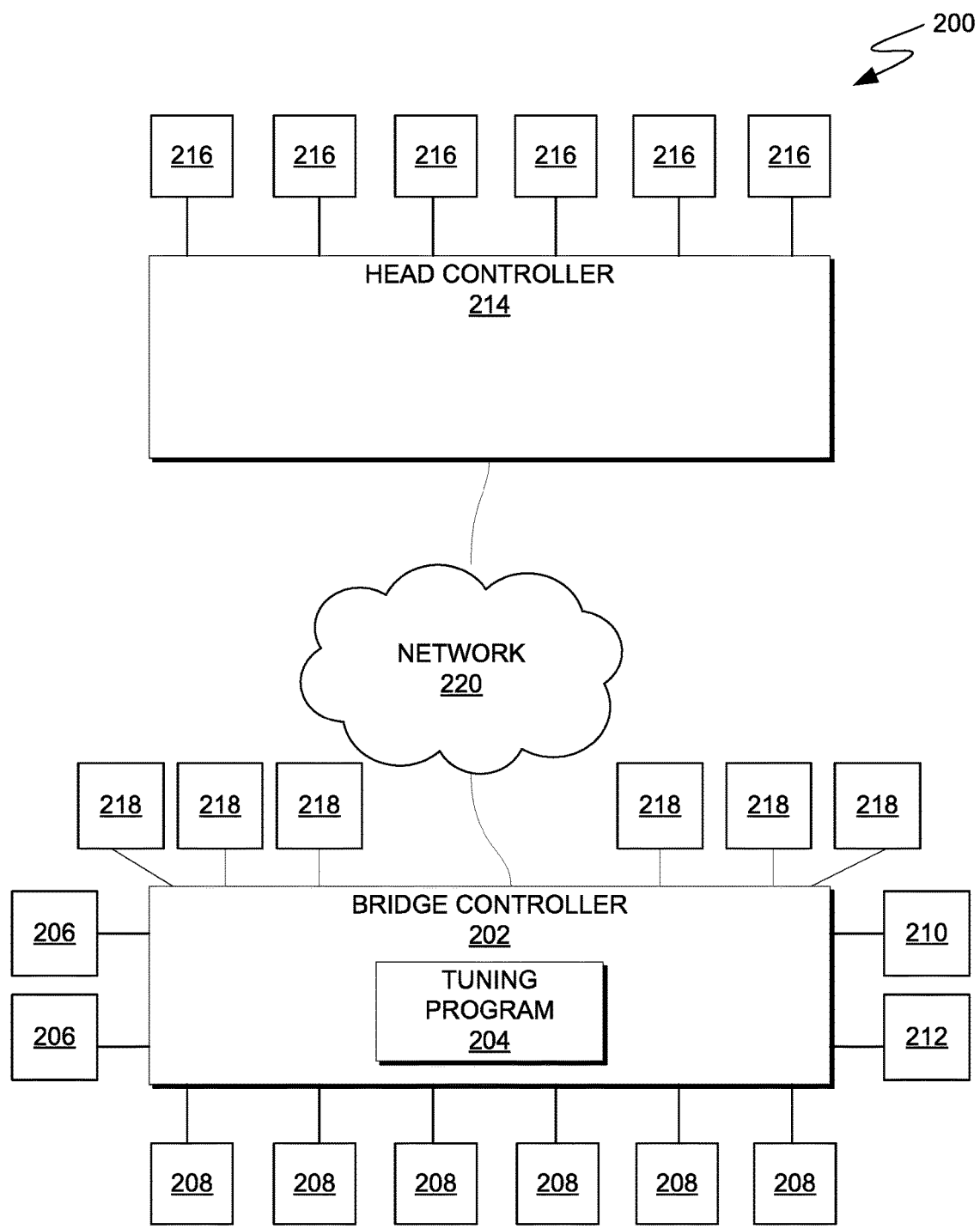
FIG. 2 is a functional block diagram illustrating a computing environment, in accordance with an embodiment of the present invention.

FIG. 2 is a functional block diagram illustrating a computing environment, in accordance with an embodiment of the present invention. For example, FIG. 2 is a functional block diagram illustrating computing environment 200. Computing environment 200 includes bridge controller 202 and head controller 214 connected over network 220. Bridge controller 202 includes tuning program 204.

In various embodiments, bridge controller 202 is a computing device that can be a standalone device, a server, a laptop computer, a tablet computer, a netbook computer, a personal computer (PC), or a desktop computer. In another embodiment, bridge controller 202 represents a computing system utilizing clustered computers and components to act as a single pool of seamless resources. In general, bridge controller 202 can be any computing device or a combination of devices with access to some or all of head controller 214, bridge servo motors 206, IR sensors 208, strain sensors 218, pressure sensor 210, magnetic pickups 212, and tuning peg servo motors 216, and with access to and/or capable of executing tuning program 204. Bridge controller 202 may include internal and external hardware components, as depicted and described in further detail with respect to FIG. 7.

In this exemplary embodiment, tuning program 204 is bridge controller 202. In other embodiments, tuning program 204 may reside on another computing device (e.g., head controller 214), provided that each can access and is accessible by each other of tuning program 204, bridge servo motors 206, infrared (IR) sensors 208, strain sensors 218, pressure sensor 210, magnetic pickups 212, and tuning peg servo motors 216. In yet other embodiments, tuning program 204 may be stored externally and accessed through a communication network, such as network 220. Network 220 can be, for example, a local area network (LAN), a wide area network (WAN) such as the Internet, or a combination of the two, and may include wired, wireless, fiber optic or any other connection known in the art. In general, network 220 can be any combination of connections and protocols that will support communications between bridge controller 202 and head controller 214, in accordance with a desired embodiment of the present invention.

In some embodiments, bridge controller 202 receives data from bridge servo motors 206, IR sensors 208, pressure sensor 210, magnetic pickups 212, and strain sensors 218. Bridge servo motors 206 operate to loosen or tighten screws in the bridge assembly. As the screws are loosened or tightened, tension in springs in the bridge assembly is adjusted. The tension of the strings are adjusted as the tension in the bridge springs are adjusted. IR sensors 208 measure the height of the strings from the body of the instrument. In some embodiments, the height of the string is indicative of the balance between string tension and spring tension. For example, where the height of the string remains constant, the tension of the strings is equal to the tension of the springs. Pressure sensor 210 is located at the base of the tremolo arm. Pressure sensor 210 determines whether a user is using the tremolo arm. In some embodiments, automatic retuning is temporarily disabled while the tremolo arm is in use. Magnetic pickups 212 detect string vibration and deliver a signal to an amplifier and tuning program 204. String vibration data is used to determine the frequency of the string. Strain sensors 218 are attached to each string. Strain sensors 218 measure string tension to determine whether a user is purposely bending a string. Where data from strain sensors 218 indicates the user is purposefully bending the string, the automatic retuning is temporarily disabled. For example, automatic retuning is disabled until strain sensor 218 determines a string is played without bending.

Tuning program 204 operates to receive signals from various sensors and cause servo motors to adjust string tension and spring tension to automatically tune a stringed instrument in real time. For example, a user interacts with tuning program 204 to initiate tuning of the instrument. In some embodiments, the user interacts with bridge controller 202 (e.g., presses a button) to initiate the tuning. In another embodiment, the user interacts with head controller 214 (e.g., presses a button) to select and initiate the tuning. Tuning program 204 receives data from various sensors to determine the height of the string from the body of the guitar and the frequency of a string being played.

Tuning program 204 can perform an initial tuning of the instrument or a retuning of the instrument. In some embodiments, the user selects a preferred height of each string prior to the initial tuning. The height is measured by IR sensors 208. Throughout the tuning process, tuning program 204 uses the initial IR sensor readings as a baseline for string height. In the initial tuning of the instrument, tuning program 204 periodically adjusts the spring tension of bridge 106 to maintain the baseline height. Tuning program 204 determines note frequencies based on information from magnetic pickups 212. The measured frequencies are compared to known frequencies of a frequency table. Tuning program 204 sends instructions to head controller 214, based on the frequency comparisons. In some embodiments, the instructions indicate actions for tuning peg servo motors 216. For example, the instructions can be for tuning peg servo motors 216 to rotate left or right, causing the tuning peg to tighten or loosen the string. Tuning program 204 continues to send instructions to head controller until the measured frequencies match the frequencies of the frequency table.

In some embodiments, tuning program 204 monitors the frequency of notes played on the instrument as the instrument is played. In these embodiments, tuning program 204 continuously monitors note frequencies via magnetic pickups 212. Tuning program 204 issues instructions to bridge servo motors 206 to rotate left or right, causing screws to increase or decrease the tension of springs attached to the bridge. As the spring tension changes, the bridge is raised or lowered. In some embodiments, tuning program 204 continues to issue instructions to bridge servo motors 206 until the measured frequency matches the frequencies of the frequency table.

In various embodiments of the present invention, head controller 214 can be a laptop computer, a tablet computer, a netbook computer, a personal computer (PC), a desktop computer, a personal digital assistant (PDA), a smart phone, or any programmable electronic device capable of communicating with bridge controller 202 via network 220. In some embodiments, head controller 214 receives data from magnetic pickups 212 and controls tuning peg servo motors 216. Tuning peg servo motors 216 operate to turn tuning pegs as the head of the instrument. As the tuning pegs are turned, the tension in the string is increased or decreased (i.e., based on the direction the tuning peg is turned).

Figure 3:
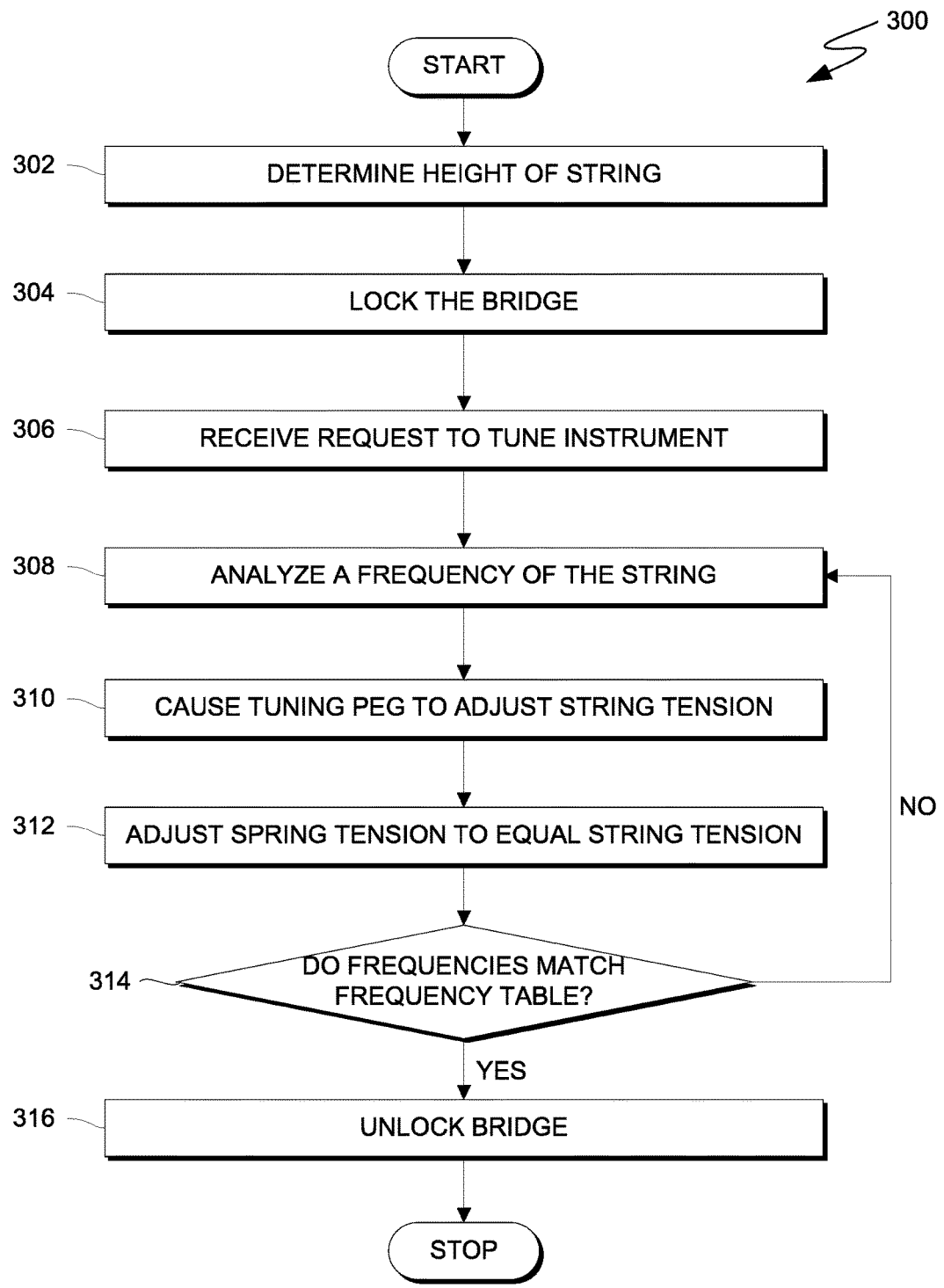
FIG. 3 is a flowchart depicting operations for automatically tuning an electric stringed instrument with a floating bridge, on a computing device within the computing environment of FIG. 2, in accordance with an embodiment of the present invention.

FIG. 3 is a flowchart depicting operations for automatically tuning an electric stringed instrument, on a computing device within the computing environment of FIG. 2, in accordance with an embodiment of the present invention. For example, FIG. 3 is a flowchart depicting operations 300 of tuning program 204, on bridge controller 202 within computing environment 200. Operations 300 are described in reference to a single string of a guitar; however, it should be appreciated that tuning program 204 can tune multiple strings are once or tune several strings in succession.

In step 302, tuning program 204 determines the height of a string. In some embodiments, the user is able to set the height of a string by adjusting the bridge. For example, by depressing the tremolo arm, the height of the bridge can be adjusted. The height of the strings from the body of the guitar is set by the user before the automated tuning begins. IR sensors located in the body of the guitar, near the bridge, measure the height of the strings. This measured height is used as a baseline for tuning the guitar. For example, as the tuning pegs are turned, the tension in the strings changes and causes the height of the string to change (e.g., as the tension increases the height increases). Tuning program 204 will make modifications to either the tension of the bridge springs or the tuning pegs to maintain the height of the string from body of the guitar.

In step 304, tuning program 204 locks the bridge. The bridge holds the strings at the desired height during the tuning process. Once the bridge is locked, the position of the bridge cannot be changed unless the bridge is unlocked.

In step 306, tuning program 204 receives a request to tune the instrument. In some embodiments, the request is a result of an interaction by the user. For example, the user interacts with a button located on either the head controller or the bridge controller. In some embodiments, the user is able to choose the tuning. For example, a user can select a standard tuning or an alternative tuning. Some examples of alternative tunings include: open, crossnote, modal, dropped, and instrumental.

In step 308, tuning program 204 analyzes a frequency of the string. In some embodiments, the user strums the guitar strings in order to cause vibration of the strings. In another embodiment, the guitar includes a mechanism that causes the strings to vibrate. The vibration of the string is recorded by a magnetic pickup. In some embodiments, the magnetic pickup is located in the body of the guitar, near the bridge. The data from the magnetic pickup is sent to the bridge controller. Tuning program 204 uses the data from the magnetic pickup to determine the frequency of the string. In some embodiments, a combination of the strain sensors and the IR sensors is used by tuning program 204 to determine which string is being played. Tuning program 204 uses a table (e.g., the table in FIG. 5, which is representative of a standard tuning) to determine whether the measured frequency is equal to an expected note on the determined string. For example, in reference to FIG. 5, tuning program 204 determines that the measured frequency was from the $3^{rd}$ string. The measured frequency was 267 Hz. Tuning program 204 references the table to determine that 267 Hz is not a frequency of an expected note from the $3^{rd}$ string. Tuning program 204 determines that the $3^{rd}$ string needs to be tuned.

In step 310, tuning program 204 causes servo motors attached to the tuning pegs to adjust the string tension. When the measured frequency does not match an expected frequency from the frequency table, tuning program 204 causes the tuning peg servo motors to be activated, to adjust the tension in the string. In some embodiments, tuning program 204 repetitively analyzes the frequency of the string and causes the tuning peg servo motors to adjust the string tension. In these embodiments, tuning program 204 moves to step 312 in response to the measured frequency equaling an expected frequency from the frequency table.

In step 312, tuning program 204 adjusts spring tension to equal the string tension. Tuning program 204 causes the bridge serve motors to tighten or loosen the screws attached to the bridge springs. The adjustment of the screws causes the tension in the springs to change. The tension in the springs is adjusted until the tension in the springs is equal to the tension in the strings at the desired height determined in step 302.

In decision 314, tuning program 204 determines whether the measured frequencies match the frequency table. Tuning program 204 uses the measured frequency to determine whether the guitar is in tune. If the measured frequencies match frequencies listed on the table for the string (decision 314, YES branch), then tuning program 204 unlocks the bridge (step 316). If the measured frequencies do not match frequencies listed on the table for the string (decision 314, NO branch), then tuning program 204 analyzes the frequency of the string again (e.g., returns to step 308). In step 316, tuning program 204 unlocks the bridge. The bridge is unlocked after all of the strings are in tune.

Figure 4:
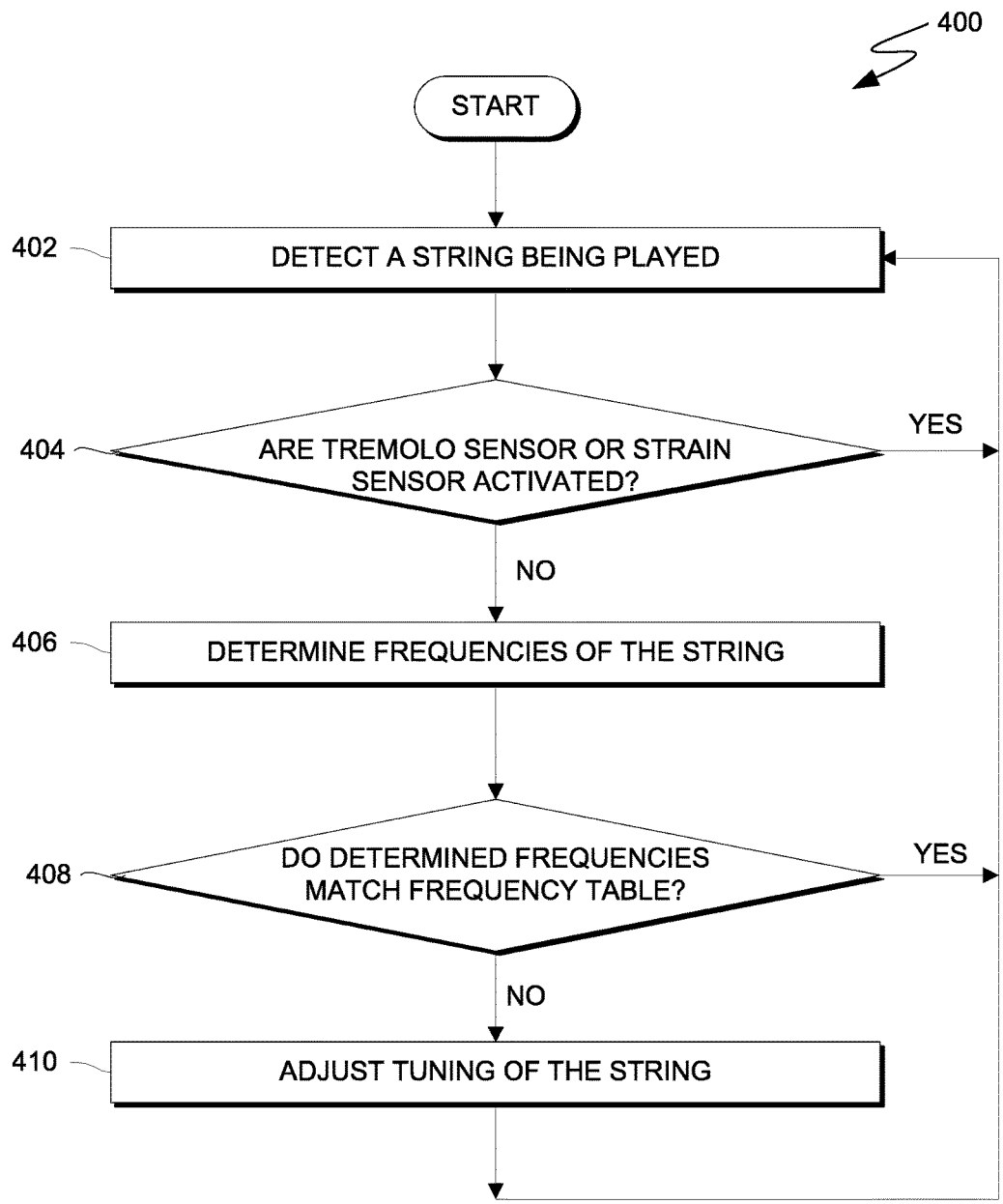
FIG. 4 is a flowchart depicting operations for automatically retuning an electric stringed instrument with a floating bridge, on a computing device within the computing environment of FIG. 2, in accordance with an embodiment of the present invention.

FIG. 4 is a flowchart depicting operations for automatically retuning an electric stringed instrument with a floating bridge, on a computing device within the computing environment of FIG. 2, in accordance with an embodiment of the present invention. For example, FIG. 4 is a flowchart depicting operations 400 of tuning program 204, on bridge controller 202 within computing environment 200. In some embodiments, operations 400 occur as a user is playing the guitar.

In step 402, tuning program 204 detects a string being played. Tuning program uses a combination of the IR sensors and the strain sensors to determine which string of a guitar is being played. For example the height of the string and strain on the change temporarily as a user strums. Data from the IR sensors and strain sensors are sent to the bridge controller and used by tuning program 204 to determine which string of the guitar is producing a note.

In decision 404, tuning program 204 determines whether a tremolo sensor or stain sensor are activated. The guitar includes a pressure sensor at the base of the tremolo arm and a strain sensor attached to each string. The pressure sensor is activated when the user presses or pulls on the tremolo arm. The tremolo arm changes tension of the strings, causing the sound from the strings to be altered. In some examples, a user may intentionally bend a string (e.g., apply more force than usually to change the tension, and therefore the sound of a string). A user intentionally bending the string will activate the strain sensor in the string, sending a signal to the bridge controller. If tuning program 204 determines that either the pressure sensor or the strain sensor for the string being played has been activated (decision 404, YES branch), then tuning program 204 temporarily disables automatic tuning of the guitar and in some embodiments loops back to step 402 once the activated sensor is no longer enabled. In some embodiments, the automatic tuning is disabled until the user releases the tremolo arm. Tuning program 204 recursively detects strings being played. Therefore, where tuning program 204 detects an activated strain sensor or tremolo sensor, tuning program 204 returns to step 402 to detect another string being played. If neither the pressure sensor nor the strain sensor are activated (decision 404, NO branch), then tuning program 204 measures the frequencies played on the strings in use (step 406).

In step 406, tuning program 204 determines multiple frequencies of notes played on the string. Tuning program 204 receives data from the magnetic pickup and determines the frequency of the string. Tuning program 204 determines whether the frequency matches a frequency from the frequency table, as discussed below in decision 408. Tuning program 204 stores measured frequencies for a predetermined time, to determine if the frequency is trending toward one end of an accepted range or another. By storing the measured frequencies, tuning program 204 knows whether to tune the string up or down.

Figure 5:
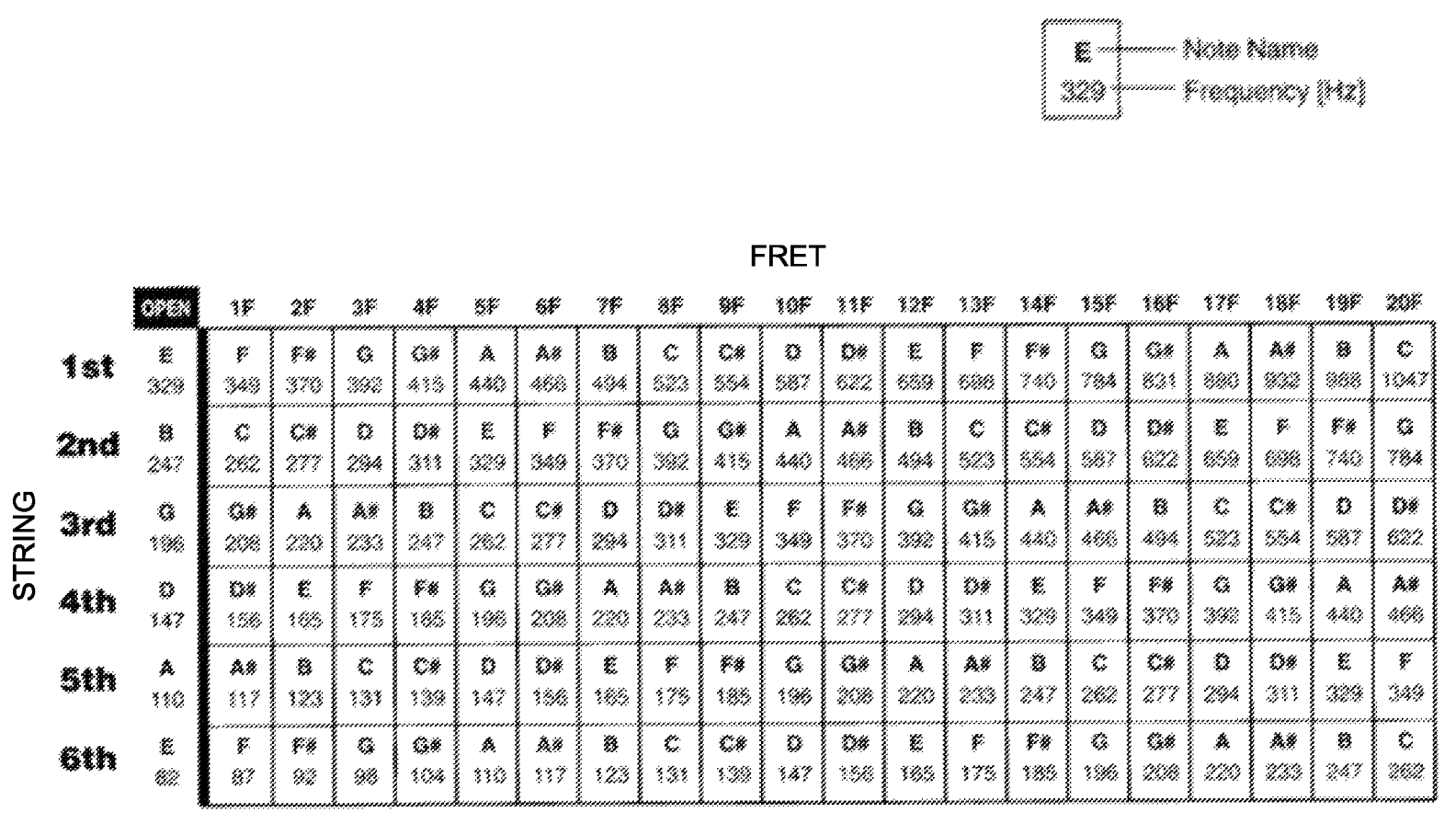

In decision 408, tuning program 204 determines whether the frequencies match frequencies on a frequency table. Tuning program 204 uses a frequency table, such as the table depicted in FIG. 5, to determine if the guitar strings are in tune. FIG. 5 is a representative frequency table (i.e., FIG. 5 represents a standard guitar tuning). It should be recognized that a user can select an alternative tuning (e.g., open, crossnote, modal, dropped, or instrumental). In some embodiments, tuning program 204 includes multiple frequency tables. In these embodiments, tuning program 204 will compare the measured frequencies with the frequency table used to tune the guitar in operations 300. As depicted in FIG. 5, the table includes all of the frequencies for notes that can be played on each string. Tuning program 204 uses the measured frequency and determined string to determine whether the guitar is in tune. If the measured frequencies match frequencies listed on the table for the string (decision 408, YES branch), then tuning program 204 returns to step 402 to detect another string being played. If the measured frequencies do not match frequencies listed on the table for the string (decision 408, NO branch), then tuning program 204 adjusts the tension of the strings and/or springs to change the tuning of the string.

In some embodiments, the measured frequency has to be within a percentage of the accepted frequency of the frequency table. For example, the measured frequency does not have to be an exact match for a frequency listed on the frequency table (e.g., FIG. 5). In some embodiments, the error percentage is based on the quality of the hardware (e.g., tuning pegs, springs, saddles, bridge, truss rod, etc.). For example, a guitar with higher quality parts will not go out of tune as often as a guitar with cheaper parts. In this example, a guitar using high quality parts may have a lower acceptable error percentage. In some embodiments, the bridge controller has machine learning capabilities. For example, the bridge controller learns to what degree a string's frequency changes with the smallest possible adjustment by the servo motor. In some embodiments, the allowable frequency error percentage is set.

For example, with reference to FIG. 5, tuning program 204 has an allowable error tolerance of +/−0.6%. For the first string, the note A is accepted from 437.36-442.64 Hz, the note A# is accepted from 463.204-468.796 Hz, the note B is accepted from 491.036-496.964 Hz, etc. If the first measured frequency of the first string is 464 Hz, the first string is in tune. If the measured frequency is 490 Hz, the frequency is not in an acceptable range for the first string and tuning program 204 continues to step 410.

In step 410, tuning program 204 adjusts the tuning of the string. Based on the frequency measurements, tuning program 204 activates either the bridge servo motors or the tuning peg servo motors to tune the strings and/or springs. In some embodiments, tuning program 204 waits until a pitch change (e.g., a new note is played) before activating the servo motors. Small changes to the string and/or spring tension keeps the guitar in tune while being played. As small changes are being made, unwanted sounds are not detected. Tuning program 204 recursively detects strings being played in order to monitor the tuning of the guitar in real time.

Figure 6:
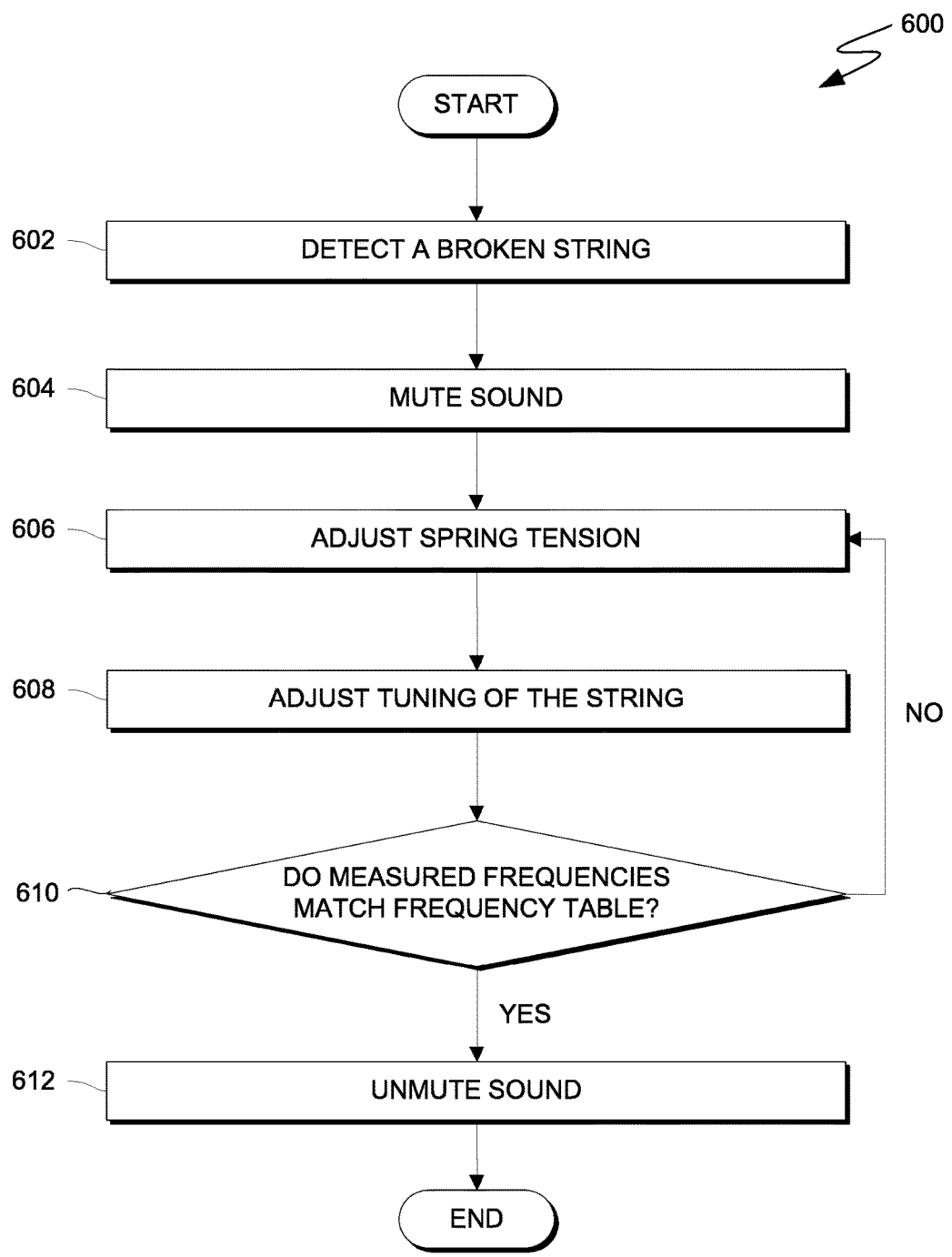
FIG. 6 is a flowchart depicting operation for automatically retuning an electronic stringed instrument with a broken string, on a computing device within the computing environment of FIG. 2, in accordance with an embodiment of the present invention.

FIG. 6 is a flowchart depicting operations for automatically retuning an electronic stringed instrument with a broken string, on a computing device within the computing environment of FIG. 2, in accordance with an embodiment of the present invention. For example, FIG. 6 is a flowchart depicting operations 600 of tuning program 204, on bridge controller 202 within computing environment 200. In some embodiments, operations 600 occur as a user is playing the guitar.

In step 602, tuning program 204 detects a broken string. In some embodiments, a broken string is detected by a sudden drastic change in spring tension. For example, when a string breaks, the sudden lack of tension on the front of the guitar will cause a sudden change in tension in the springs. In another embodiment, the broken string is detects by the strain sensor attached to the string.

In step 604, tuning program 204 mutes the sound. Tuning program 204 stops the magnetic pickup from sending the signal to the amplifier. The guitar is muted because resulting tuning changes will be more drastic than those in operations 400. For example, changes made to the remaining strings will have a noticeable sound, if the strings are played during the tuning.

In step 606, tuning program 204 adjusts the spring tension. Tuning program 204 causes the servo motors to lower the tension in the springs to account for the loss of tension from the broken spring. The tension of springs is adjusted until it equals the tension in the strings at the desired height.

In step 608, tuning program 204 adjusts the tuning of the strings. Tuning program 204 measures the frequency of each unbroken string. Tuning program 204 causes tuning peg servo motors to adjust the tuning pegs. The amount and direction of adjustment is based on the difference between the measured frequency and the frequency table value.

In decision 610, tuning program 204 determines whether the measured frequencies match the frequency table. Tuning program 204 uses a frequency table (e.g., the table in FIG. 5) and the measured frequency to determine whether the guitar is in tune. If the measured frequencies match frequencies listed on the table for each string (decision 610, YES branch), then tuning program unmutes the guitar (step 612). If the measured frequencies do not match frequencies listed on the table for each string (decision 610, NO branch), then tuning program 204 loops back to step 606 to adjust tension of the string and/or springs to change the tuning of the string. Each of the unbroken strings are tuned before the guitar is unmuted.

In step 612, tuning program 204 unmutes the sound. In response to determining that all of the strings are properly tuned, tuning program 204 unmutes the sound. Tuning program 204 allows signals from the magnetic pickups to pass to the amplifier.

Figure 7:
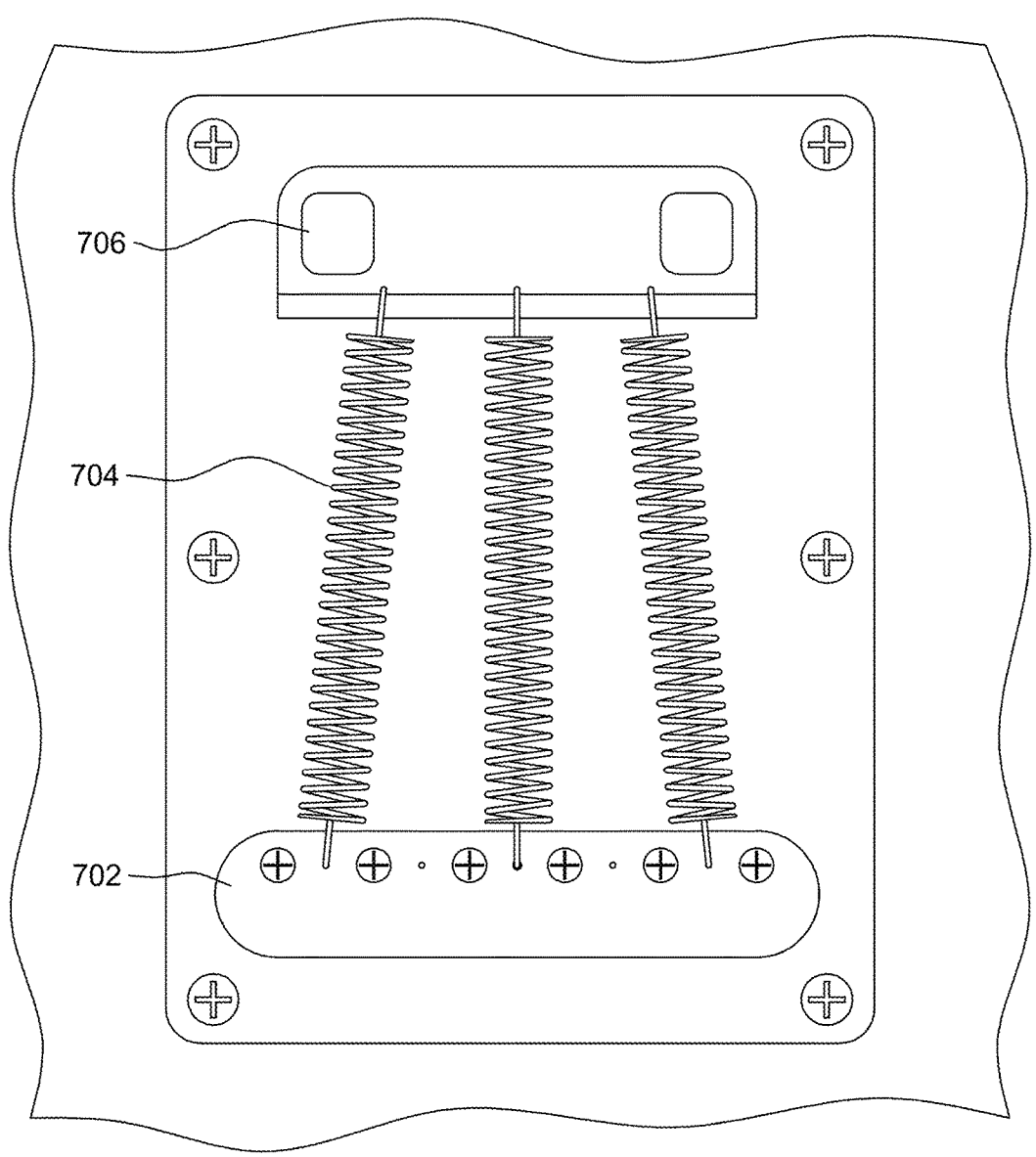
FIG. 7 is an illustration of a bridge tuning system, in accordance with an embodiment of the present invention.

FIG. 7 is an illustration of a bridge tuning system, in accordance with an embodiment of the present invention. In some embodiments, the bridge tuning system extends to the back of the guitar. The bridge tuning system includes bridge 702, springs 704, bridge servo motors 706, and the bridge controller (not depicted). Bridge 702 is a back view of bridge 106 (as shown in FIG. 1). Springs 704 create tension in the strings attached to bridge 702. The tension in springs 704 is controlled by screws which are rotated by bridge servo motors 706. Tightening the screws causes the tension in springs 704 to increase, which causes the tension in the strings to increase. Loosening the screws causes the tension in springs 704 to decrease, which causes the tension in the strings to decrease. Small changes to the tension of springs 704 allow bridge controller to make small changes to the tension of the strings. The small changes in tension result in small changes to the frequency of a string. Bridge servo motors 706 are controlled by instructions from the bridge controller.

Figure 8:
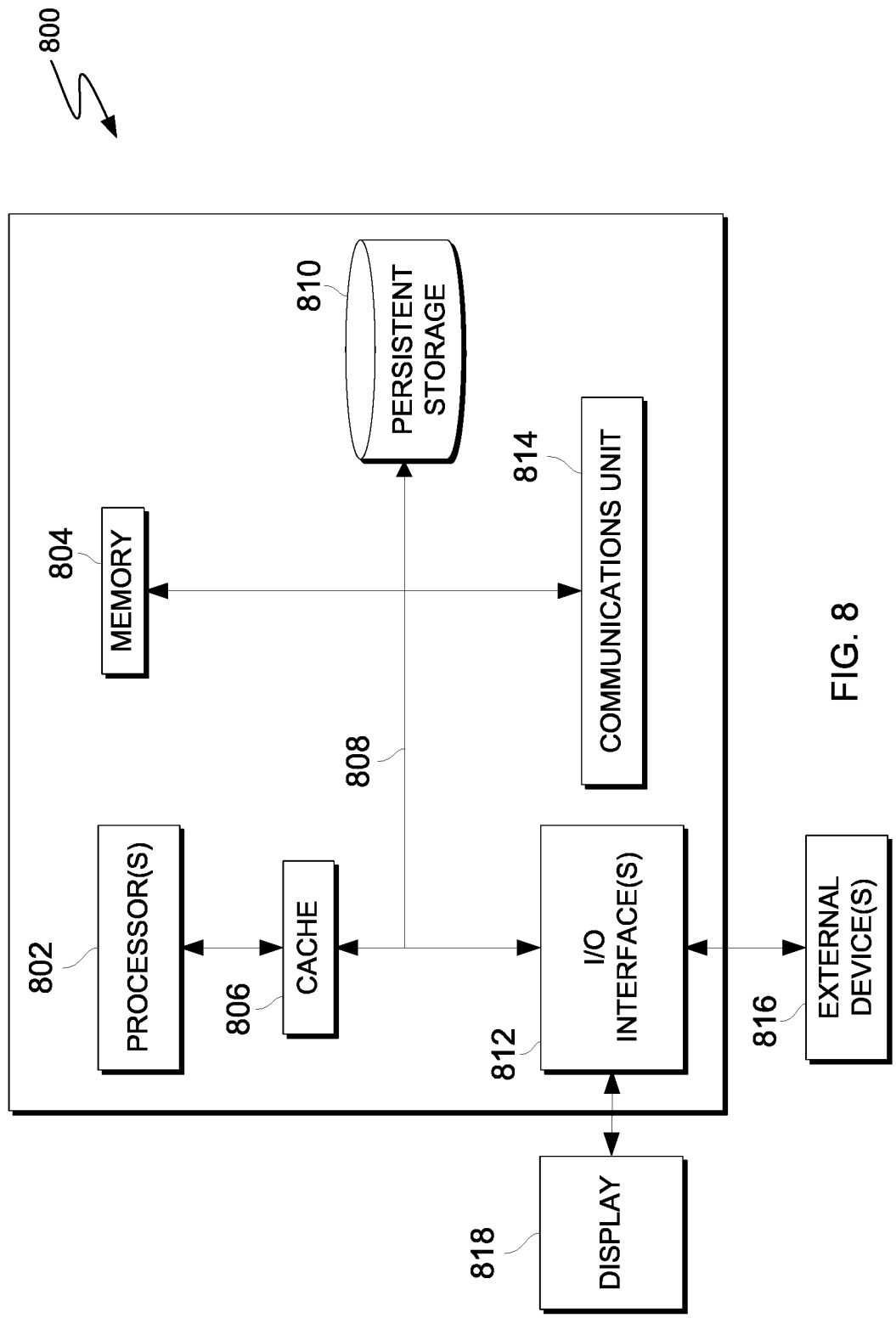
FIG. 8 is a block diagram of components of a computing device executing operations for automatically tuning an electric guitar with a floating bridge, in accordance with an embodiment of the present invention.

FIG. 8 is a block diagram of components of a computing device, generally designated 800, in accordance with an embodiment of the present invention. In one embodiment, computing device 800 is representative of bridge controller 202. For example, FIG. 7 is a block diagram of bridge controller 202 within computing environment 200 executing operations of tuning program 204.

It should be appreciated that FIG. 8 provides only an illustration of one implementation and does not imply any limitations with regard to the environments in which different embodiments may be implemented. Many modifications to the depicted environment may be made.

Computing device 800 includes communications fabric 808, which provides communications between computer processor(s) 802, memory 804, cache 806, persistent storage 810, communications unit 814, and input/output (I/O) interface(s) 812. Communications fabric 808 can be implemented with any architecture designed for passing data and/or control information between processors (such as microprocessors, communications and network processors, etc.), system memory, peripheral devices, and any other hardware components within a system. For example, communications fabric 808 can be implemented with one or more buses.

Memory 804 and persistent storage 810 are computer-readable storage media. In this embodiment, memory 804 includes random access memory (RAM). In general, memory 804 can include any suitable volatile or non-volatile computer readable storage media. Cache 806 is a fast memory that enhances the performance of processors 802 by holding recently accessed data, and data near recently accessed data, from memory 804.

Program instructions and data used to practice embodiments of the present invention may be stored in persistent storage 810 and in memory 804 for execution by one or more of the respective processors 802 via cache 806. In an embodiment, persistent storage 810 includes a magnetic hard disk drive. Alternatively, or in addition to a magnetic hard disk drive, persistent storage 810 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 810 may also be removable. For example, a removable hard drive may be used for persistent storage 810. Other examples include optical and magnetic disks, thumb drives, and smart cards that are inserted into a drive for transfer onto another computer-readable storage medium that is also part of persistent storage 810.

Communications unit 814, in these examples, provides for communications with other data processing systems or devices, including resources of network 220. In these examples, communications unit 814 includes one or more network interface cards. Communications unit 814 may provide communications through the use of either or both physical and wireless communications links. Program instructions and data used to practice embodiments of the present invention may be downloaded to persistent storage 810 through communications unit 814.

I/O interface(s) 812 allows for input and output of data with other devices that may be connected to computing device 800. For example, I/O interface 812 may provide a connection to external devices 816 such as a keyboard, keypad, a touch screen, and/or some other suitable input device. External devices 816 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 810 via I/O interface(s) 812. I/O interface(s) 812 also connect to a display 818.

Display 818 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product, the computer program product comprising:
    a computer readable storage medium and program instructions stored on the computer readable storage medium, the program instructions comprising:
    program instructions to determine an initial height of a first string of an instrument having a plurality of strings and a floating bridge, wherein a height of the plurality of strings is determined using a bridge sensor;
    program instructions to lock the floating bridge;
    program instructions to analyze a frequency of a first string;
    program instructions to determine the frequency of the first string does not match a predetermined frequency;
    program instructions to cause a tuning peg servo motor to adjust a tuning peg, the tuning peg configured to adjust a string tension of the first string;
    program instructions to cause one or more bridge servo motors to adjust a spring tension in one or more springs attached to the floating bridge, wherein the spring tension of the one or more springs equals the string tension of the first string;
    program instructions to unlock the floating bridge in response to determining the frequency of the first string matches the predetermined frequency;
    program instructions to detect that a second string of the plurality of strings is vibrating within a predetermined range of frequencies;
    program instructions to detect an increased tension of the second string, wherein the increased tension is not within a predetermined threshold and in response, suspending, by one or more processors, detection of frequencies for the second string;
    program instructions to detect movement of a tremolo arm and in response, disabling, by one or more processors, detection of frequencies for the plurality of strings;
    program instructions to determine a first frequency of the second string, using a magnetic pickup;
    program instructions to compare the first frequency to a table of expected frequencies;
    program instructions to detect a pitch change of the second string; and
    program instructions to determine the first frequency is not on the table of expected frequencies;
    program instructions to cause the tuning peg servo motor to adjust the tuning peg, the tuning peg configured to adjust a tension of the second string, wherein the instrument is retuned while the instrument is being played;
    program instructions to detect a broken string of the plurality of strings;
    program instructions to mute a sound output of the instrument;
    program instructions to adjust the spring tension of the one or more springs, wherein the spring tension is adjusted until the spring tension equals the string tension, and wherein the floating bridge is at a user defined position;
    program instructions to analyze a second frequency of the first string;
    program instructions to determine the second frequency of the first string does not match a predetermined frequency;
    program instructions to cause a tuning peg servo motor to adjust a tuning peg, the tuning peg configured to adjust a string tension of the first string; and
    in response to determining the first string is tuned, program instructions to restore the sound output of the instrument.

* * * * *